(12) United States Patent
Shetley

(10) Patent No.: US 6,988,492 B2
(45) Date of Patent: Jan. 24, 2006

(54) HYDROGEN AND LIQUID FUEL INJECTION SYSTEM

(76) Inventor: Michael Shetley, Rte. 6, Box 845, Okeechobee, FL (US) 34974

( * ) Notice: Subject to any disclaimer, the term of this patent is extended or adjusted under 35 U.S.C. 154(b) by 292 days.

(21) Appl. No.: 10/461,259

(22) Filed: Jun. 12, 2003

(65) Prior Publication Data
US 2004/0250797 A1 Dec. 16, 2004

(51) Int. Cl.
F02M 21/02 (2006.01)

(52) U.S. Cl. ...................... 123/525; 123/527
(58) Field of Classification Search ................ 123/525, 123/299, 575
See application file for complete search history.

(56) References Cited

U.S. PATENT DOCUMENTS

| | | | |
|---|---|---|---|
| 3,696,795 A | 10/1972 | Smith et al. | |
| 4,041,910 A | 8/1977 | Houseman | |
| 4,343,272 A | 8/1982 | Buck | |
| 4,362,137 A | 12/1982 | O'Hare | |
| 4,508,064 A | 4/1985 | Watanabe | |
| 5,085,176 A | 2/1992 | Brinkley, III | |
| 5,315,973 A * | 5/1994 | Hill et al. | 123/304 |
| 5,413,075 A | 5/1995 | Mamiya et al. | |
| 5,755,211 A * | 5/1998 | Koch | 123/525 |
| 5,852,993 A | 12/1998 | Anderson | |
| 5,890,459 A * | 4/1999 | Hedrick et al. | 123/27 GE |
| 6,026,787 A * | 2/2000 | Sun et al. | 123/525 |
| 6,119,651 A | 9/2000 | Anderson | |
| 6,360,714 B1 * | 3/2002 | Kotooka et al. | 123/299 |
| 6,564,770 B1 * | 5/2003 | Cathcart | 123/299 |
| 6,588,406 B2 * | 7/2003 | Oprea | 123/525 |
| 6,591,817 B2 * | 7/2003 | Deutsch | 123/525 |
| 6,729,313 B2 * | 5/2004 | Ricco | 123/525 |
| 6,758,194 B2 * | 7/2004 | Shetley et al. | 123/557 |

* cited by examiner

Primary Examiner—Henry C. Yuen
Assistant Examiner—Jason Benton

(57) ABSTRACT

The present invention relates to a small adapter manifold that is constructed and arranged to fit into the standard fuel injector cavity for each cylinder of an automobile engine. The manifold includes a cavity for retaining the standard fuel injector and a liquid fuel passage, wherein the fuel injector can supply liquid fuel directly to the cylinder. The manifold also includes a separate hydrogen passage wherein a solenoid or servo valve regulates the flow of hydrogen entering each cylinder of the engine. A control module communicates with the on-board computer to allow the vehicle operator to choose a fuel. Once the fuel is chosen the computer utilizes the standard sensors to regulate the amount of hydrogen or gasoline supplied to the engine.

13 Claims, 7 Drawing Sheets

HYDROGEN AND LIQUID FUEL INJECTION SYSTEM

FIELD OF THE INVENTION

This invention relates to a fuel system for an internal combustion engine and more particularly to a device which cooperates with a standard fuel injector socket to control direct injection of hydrogen and/or liquid fuel to allow complete engine operation.

BACKGROUND OF THE INVENTION

A fuel system is the component of an internal combustion engine which often has the greatest impact on performance and cost. Accordingly, fuel systems for internal combustion engines have received a significant portion of the total engineering effort expended to date on the development of the internal combustion engine. For this reason, today's engine designer has an extraordinary array of choices and possible permutations of known fuel system concepts and features. Design effort typically involves extremely complex and subtle compromises among considerations such as cost, size, reliability, performance, ease of manufacture, and retrofit capability on existing engine designs.

The challenge to contemporary designers has been significantly increased by the need to respond to government mandated emissions abatement standards while maintaining or improving fuel efficiency. In view of the mature nature of fuel system designs, it is extremely difficult to extract both improved engine performance and emissions abatement from further innovations in the gasoline fuel system art. In response, the world's automakers have made significant investment in search of viable alternative fuel vehicles. Hydrogen powered vehicles are considered to be the most promising long-term automotive option, operating very efficiently while producing very little or no vehicle emissions. However, the environmentally friendly hydrogen currently does not have a distribution infrastructure capable of supplying consumers. Developing a viable distribution infrastructure could take years, with consumers in rural areas being the last to receive availability.

Therefore, commercially competitive fuel injection systems of the future will not only need to incorporate new design features for better achieving various objectives including improved engine performance and emissions abatement, but form a system capable of utilizing hydrogen as well as gasoline to effectively and reliably achieve the greatest number of objectives.

Improved efficiency, quick response and effective reliable injection rate are critical features for achieving objectives such as improved engine performance and emissions abatement. Other important features include packaging flexibility for installation on various engine configurations including retrofitting existing engines.

In practice, the injection of gaseous fuel, e.g. hydrogen, propane, natural gas and the like into an engine, has typically been accomplished in two alternative methods. The first method involves introducing the fuel through an inlet air passage, e.g. gas mixer, where the vacuum of the engine draws the air-fuel mixture into the cylinder. The second method involves injecting the fuel directly into the cylinder of the engine, e.g. direct injection. Each of these methods, as practiced with the prior art, have their own disadvantages with respect to introducing hydrogen to an engine.

Various mixer apparatus have been proposed for mixing gaseous fuel with air entering the engine. There is a considerable amount of prior art in this field, however, much of the effort has concentrated on the addition of gaseous fuels such as natural gas, methane gas, liquid petroleum gas or others. However, due to the combustive properties of hydrogen and the widely varying loads of vehicles this method often results in a problem referred to as "flashback". Flashback occurs when the mixture of hydrogen and oxygen ignite in the intake manifold of the engine causing a severe explosion.

Alternatively, hydrogen may be injected into the combustion chamber using direct injection. When hydrogen is injected directly into the combustion chamber of an engine, the injection usually takes place during the intake or compression stroke either before and/or during the combustion process. Controlling the amount of the gaseous fuel entering the combustion chamber has proven difficult with this method, generally resulting in unacceptable torque characteristics and output from the engine.

Accordingly, a cost effective, reliable and versatile system for improving combustion and reducing emissions from hydrogen and/or gasoline fuels that can be easily adapted to existing gasoline engines without extensive modification would satisfy a long felt need in the art.

DESCRIPTION OF THE PRIOR ART

U.S. Pat. No. 5,413,075, issued May 9, 1995 to Mamiya, et al. discloses an air-fuel ratio control system for operating an internal combustion engine entirely from a gaseous fuel containing at least partly hydrogen gas. The system comprises two injectors per cylinder. The primary injector injects hydrogen into the intake manifold where it pre-mixes with oxygen prior to entering the engine. The secondary injector injects hydrogen directly into the cylinder during light load conditions to enrichen the pre-mixed air-fuel mixture supplied to the engine by the primary injector. The system has a fuel supply control valve which adjusts the amount of the gaseous fuel supplied to the engine via the injectors and a control unit which controls the fuel supply control valve so that the air-fuel ratio is varied according to engine load. The control unit utilizes sensors that detect the temperature of the burned gas within the cylinder. The temperature of the burned gas is used by the control unit to determine when to inject gas with the secondary injector. This system is setup to inject only gaseous fuels into an engine and does not disclose a method of injecting liquid fuel. While the system does disclose the concept of injecting hydrogen directly into the cylinder, the direct injection is only a supplement to the primary hydrogen injection system and the patent teaches away from using direct injection for complete operation of an engine. In addition, there is not an apparatus suggested or disclosed for injecting the hydrogen.

U.S. Pat. Nos. 6,119,651 and 5,852,993 to Anderson disclose a hydrogen powered vehicle including an internal combustion engine operably connected to power the vehicle and adapted to connect to hydrogen supply line. The connection to the hydrogen supply is facilitated by a modified spark plug. The spark plug comprises an elongated hollow housing having an electrode assembly extending through the central area into the cylinder. The housing has a fuel inlet port in fluid communication with a gas supply line, and an insulator surrounding the electrode assembly within the housing. The insulator has an outer surface with fuel channels in communication with the inlet port and the combustion chamber. Hydrogen gas stored in a tank is regulated down to approximately 25 PSI and connected to the modified spark plug via a throttle control mounted in proximity to the tank. There is no suggestion or disclosure of a device capable of closely regulating the amount of hydrogen allowed to flow into the cylinder based on load conditions. The hydrogen is allowed to free flow into the cylinder until the specified pressure is reached. This device is more suited to constant load engines such as lawnmowers and the like.

U.S. Pat. No. 4,343,272, to Buck discloses two devices for supplementing conventional liquid fuels with gaseous fuels by injection directly into the cylinder. The first device consists of a distributor that allows the gas to flow through the sparkplug wires and the spark plug into the cylinder.

The second embodiment consists of a series of conduits constructed through the crank shaft, connecting rod, wrist pin, and piston. The conduits are arranged to align at the minimum and maximum points of compression during shaft rotation to allow gas to flow into the combustion chamber. Neither of these devices teach or suggest a servo-controlled valve means for precisely controlling the amount of hydrogen that can enter the cylinder.

U.S. Pat. No. 3,696,795 to Smith discloses a method for operating an internal combustion engine that injects fuel (hydrogen gas) during the compression cycle. At the end of the exhaust stroke, after the exhaust valve closes, the system injects oxygen into the cylinder. Fuel is then progressively injected into the cylinder under pressure so that it burns progressively as it is injected. After combustion is completed and just before the piston reaches bottom dead center the exhaust valve opens and water is injected into the cylinder to cool the chamber before the next cycle. The water, fuel and oxygen are metered by a valve driven by an auxiliary camshaft, which is in turn driven by the crankshaft.

U.S. Pat. No. 5,085,176 to Brinkley discloses a method and apparatus for generating and injecting hydrogen into an engine. The apparatus consists of an elongated superheated chamber containing a catalyst mounted to the spark plug inlet of a cylinder and extending vertically from the engine. During the engine intake stroke water or steam is fed into the chamber where it reacts with the catalyst to produce hydrogen which is drawn into the combustion chamber. The distal end of the chamber contains a spark plug mounted in communication with the interior of the chamber to provide a spark to ignite the hydrogen within the cylinder for combustion. Heat from the combustion regenerates the catalyst for the next cycle.

U.S. Pat. No. 4,508,064 to Wantanabe discloses an internal combustion engine that utilizes directly injected hydrogen and water. The device is aimed at staggering the injection timing of the hydrogen and water to control the combustion speed of the hydrogen. The hydrogen and the water are each provided with their own injection device for introducing their respective fluids into the combustion chamber. While the patent discloses the concept of directly injecting the hydrogen and water, there is no disclosure or suggestion of any type of injection apparatus. Moreover utilization of two injection ports in each cylinder would require major engine modifications and eliminates the possibility of retrofit to existing engines.

U.S. Pat. No. 4,362,137 to O'Hare discloses a hydrogen pyrolysis fuel injection system. The system is aimed at allowing a gasoline engine to burn extremely lean mixtures without the problems that are normally associated therewith. In the disclosure a gasoline engine is fitted with a direct fuel injection system. The direct fuel injection system used is the piston type normally used for diesel engines. Hydraulic pressure forces liquid fuel into a pyrolysis chamber where it is subjected to very high temperatures and then out of the cell and into a cooler. The liquid fuel is converted enroute into a mixture of gas-vapor-liquid. The highly pressurized mixture is injected directly into the compressed air within the combustion chamber. Adjustment of this type of device is difficult. Variations in the amount of gas and liquid in the mixed fuel, combined with varying load conditions of most engines, require constant adjustment to cause an efficient burn of the mixtures.

U.S. Pat. No. 4,041,910 to Houseman discloses a method of operating an internal combustion engine so that it provides, using some of its cylinders, a hydrogen rich gas which can be used as a fuel by the remaining cylinders. In the disclosure an extremely rich mixture of gasoline and air are supplied to two cylinders. The mixture contains only a sufficient amount of oxygen to allow partial oxidization when compressed and ignited. The partially oxidized mixture is broken down into hydrogen (H2) and carbon monoxide (CO), mixed with fresh air, and injected into the remaining cylinders. There is no disclosure or suggestion contained in the reference regarding the injection apparatus utilized to inject the H2 mixture.

None of the prior art patents disclose an injection device that cooperates with a standard automotive injection port and is capable of directly injecting hydrogen and/or liquid gasoline directly into an engine. Nor do they suggest a method of precisely controlling the volume of hydrogen that is allowed to flow into the combustion chamber per cycle.

SUMMARY OF THE INVENTION

It is well established that the fuel system is the component of an internal combustion engine which often has the greatest impact on emissions, performance and cost. While almost all of the prior art has concentrated on the fuel systems which supply liquid fuel such as gasoline, it is well known that emissions can be reduced and performance increased by combusting a gaseous fuel such as hydrogen in an internal combustion engine. However, no infrastructure currently exists for the widespread distribution of hydrogen fuel for use in vehicles. Therefore, the present invention provides a system and method for injecting either hydrogen and/or a liquid fuel such as gasoline to allow complete operation of a vehicle utilizing either or both fuels. This system allows the operator to utilize hydrogen in areas where it may be available and gasoline in areas where hydrogen is not available. In addition, the system is suitable for installation in new vehicles and requires minimal modifications for retrofit to existing vehicles.

For each cylinder of the engine the instant invention utilizes a small adapter manifold that is constructed and arranged to fit into a standard fuel injector cavity. The manifold includes a cavity for retaining the standard fuel injector and a liquid fuel passage, wherein the fuel injector can supply liquid fuel directly to the cylinder. The manifold also includes a separate hydrogen passage wherein a solenoid or servo valve regulates the flow of hydrogen entering the engine. A control module communicates with the on-board computer to allow the vehicle operator to choose a fuel. Once the fuel is chosen the computer utilizes the standard sensors to regulate the amount of hydrogen or gasoline supplied to the engine.

In operation, an electrical control module is used to choose either gasoline or hydrogen fuel. If hydrogen fuel is chosen the pressurized hydrogen is allowed to flow from the supply through a conduit to the hydrogen injector. An electrical control module works in conjunction with the on-board computer to operate a servo or solenoid valve to deliver the proper amount of fuel to the engine for normal operation. The gaseous hydrogen flows through the hydrogen passage into the combustion chamber. If liquid fuel is chosen it is allowed to flow from a tank through a conduit to the liquid injector mounted in the adapter manifold. The on-board computer causes the injector to force the liquid fuel through a nozzle at high pressure to create a superfine atomized spray which is directed into the combustion chamber flowing through the gasoline passage and into the combustion chamber.

Accordingly, it is an objective of the present invention to overcome the disadvantages and shortcomings of the prior art and to provide a hydrogen fuel injection system capable of effectively and predictably controlling fuel injection timing and metering.

It is a further objective of the present invention to teach a device for precisely and directly injecting a gaseous fuel such as hydrogen into the cylinder of an internal combustion engine.

It is another objective of the present invention to teach a hydrogen fuel injection system which provides greater operating flexibility and performance.

It is yet another objective of the present invention to teach a fuel injection system which provides a selectable choice of fuels for combustion.

It is a further objective of the present invention to teach a gaseous and liquid fuel injection kit which allows precision and direct injection of a gaseous fuel such as hydrogen and/or a liquid fuel such as gasoline into the cylinder of an internal combustion engine.

It is a still further objective of the present invention to teach a gas and liquid fuel injection kit that can be easily installed on existing engine architectures having electronic fuel injection.

Yet another objective of the present invention to teach a gas and liquid fuel injection kit which is inexpensive to manufacture and which is simple and reliable in operation.

Still another objective of the present invention is to teach a gas and liquid fuel injection kit which is simple to install and which is ideally suited for original equipment and after market installations on an internal combustion engine.

Still yet another objective of the present invention is to teach a gas and liquid fuel injection kit which provides rapid response, improved injection metering and repeatability for improved operating efficiency.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
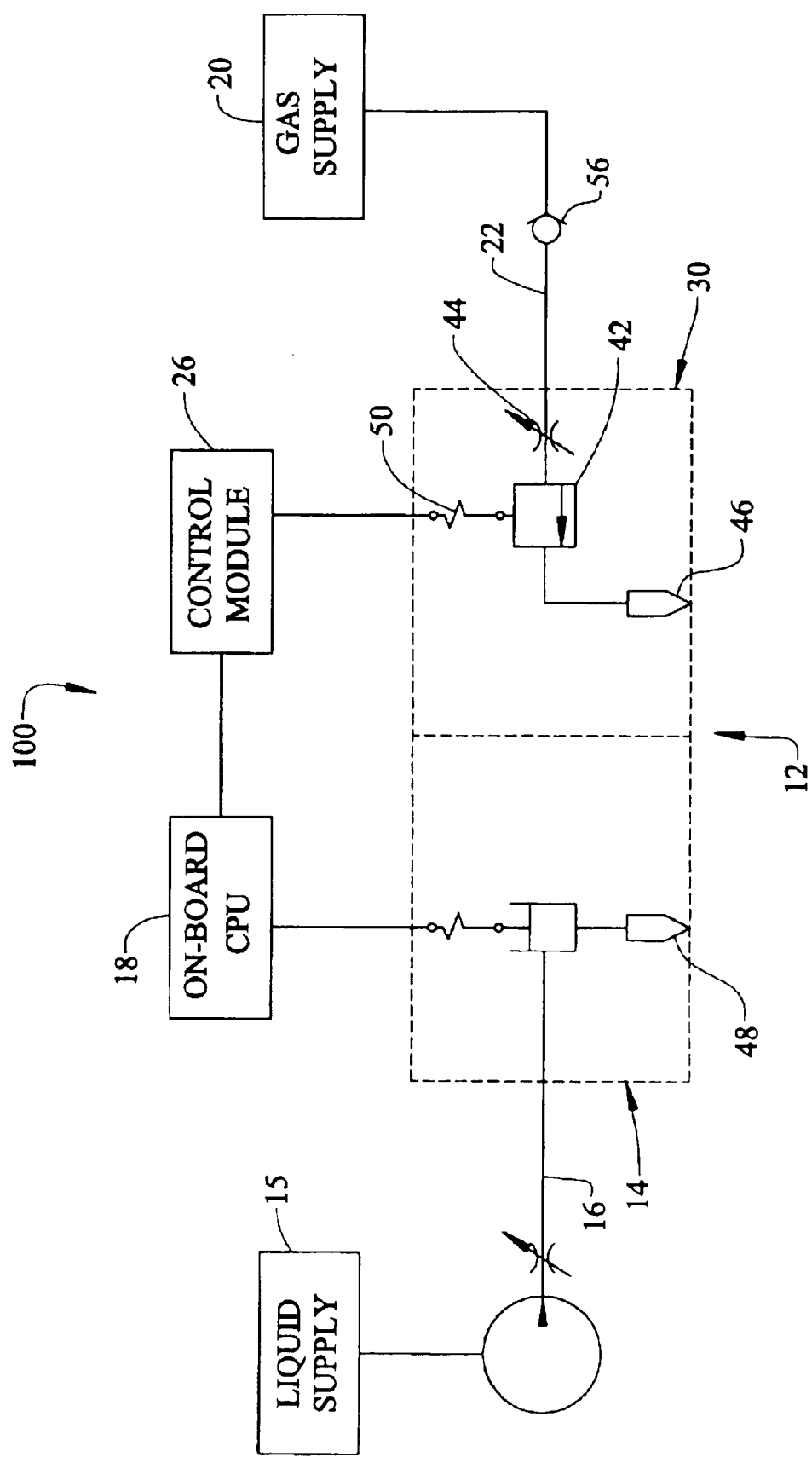
FIG. 1 is a schematic view of one embodiment of the instant invention.

In order to permit operation of an internal combustion engine on hydrogen and/or a liquid fuel such as gasoline and the like, and due to the unsuitability of the prior art to be installed on pre-existing equipment without extensive modification to the equipment, the present invention utilizes an electrically controlled injection system 100 as set forth in FIG. 1.

Referring to FIG. 1, there is shown a schematic of the electrically controlled fuel injection system 100 of the present invention including electrically actuated unit injector 12 resulting in a flexible, efficient system capable of producing various combinations of discreet and blended fuel injections during a single combustion cycle. Fuel injection system 100 includes a liquid fuel supply 15 for supplying liquid fuel to a liquid fuel rail 16 at a supply pressure. The liquid fuel may be comprised of various combustible liquids which may include but should not be limited to gasoline, diesel, solvents, oils, alcohol, solutions or emulsions which may include water. The liquid fuel can be used for complete operation of the engine or combinations of the liquid/solution/emulsion can be varied to control the duration of the combustion cycle of the gaseous fuel. The liquid fuel injector 14 is connected to the liquid fuel rail for receiving liquid fuel at a pressure of up to about 250 pounds per square inch for injection into a combustion chamber. The liquid fuel injector is operably connected to the vehicles on-board computer 18 for controlling the injection of the liquid fuel. Computer controlled liquid fuel injection systems such as the one discussed above are well known in the art and therefore a detailed discussion of operation will be omitted. The system also includes a gaseous fuel supply 20 for supplying a gaseous fuel, e.g. hydrogen and the like, to a gaseous fuel rail 22 at a supply pressure of up to about 3000 pounds per square inch. The gaseous fuel rail 22 is provided with a check valve 56 and may optionally contain a fire suppression valve (not shown). The gaseous fuel injector 30 is connected to the gaseous fuel rail 22 for receiving gaseous fuel for injection into a combustion chamber. An electric control module 26 is constructed and arranged to communicate with the vehicles on-board computer 18 and the gaseous fuel injector 30 for adjustably and timingly cycling the gaseous injector 30 to inject gaseous fuel into the engine for combustion. Although only one fuel injector unit 12 is shown in detail, it is understood that fuel injection system 100 includes at least one fuel injection unit for each cylinder of a multi-cylinder internal combustion engine having any number of cylinders, such as two, three, four, six, eight, ten or twelve cylinders. Each cylinder having a piston reciprocatively disposed in the cylinder and operatively connected to a crankshaft, the area above the piston defining a combustion chamber.

The gaseous fuel supply 20 may include but should not be limited to hydrogen fuel sources capable of generating an adequate supply of hydrogen to operate an engine, such as storage tank(s), methanol reformers, gasoline reformers, metal hydrides, sodium borohydrides, electrolysis cells generating hydrogen from liquids such as water, as well as other suitable gaseous fuel sources. As such gaseous fuel sources vary in size and configuration the gaseous fuel supply can be mounted at any convenient location on the vehicle and the gaseous fuel conveyed via conduit to the injector(s).

Figure 2:
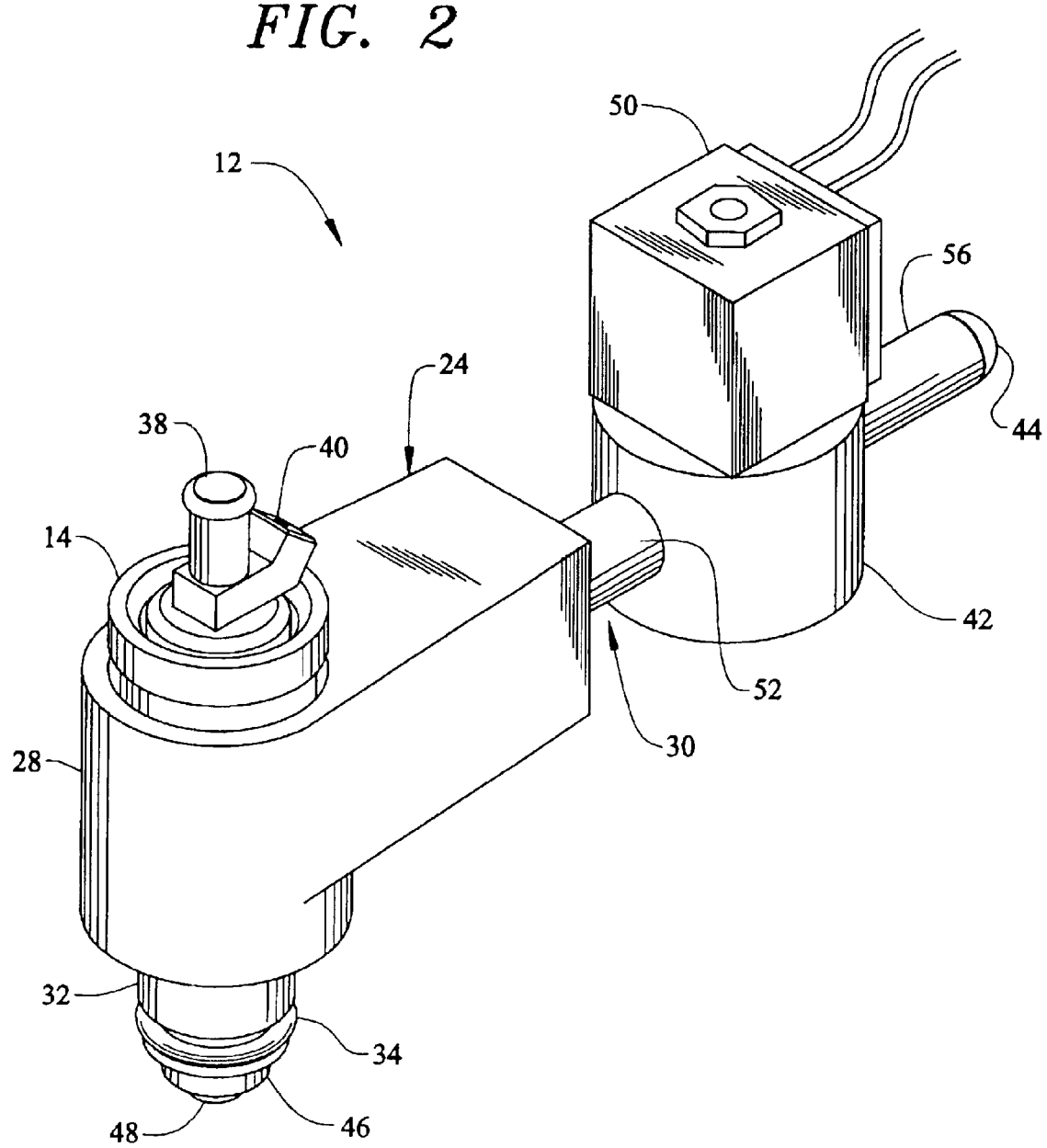
FIG. 2 is a perspective view illustrating one embodiment of the instant invention.
Figure 3:
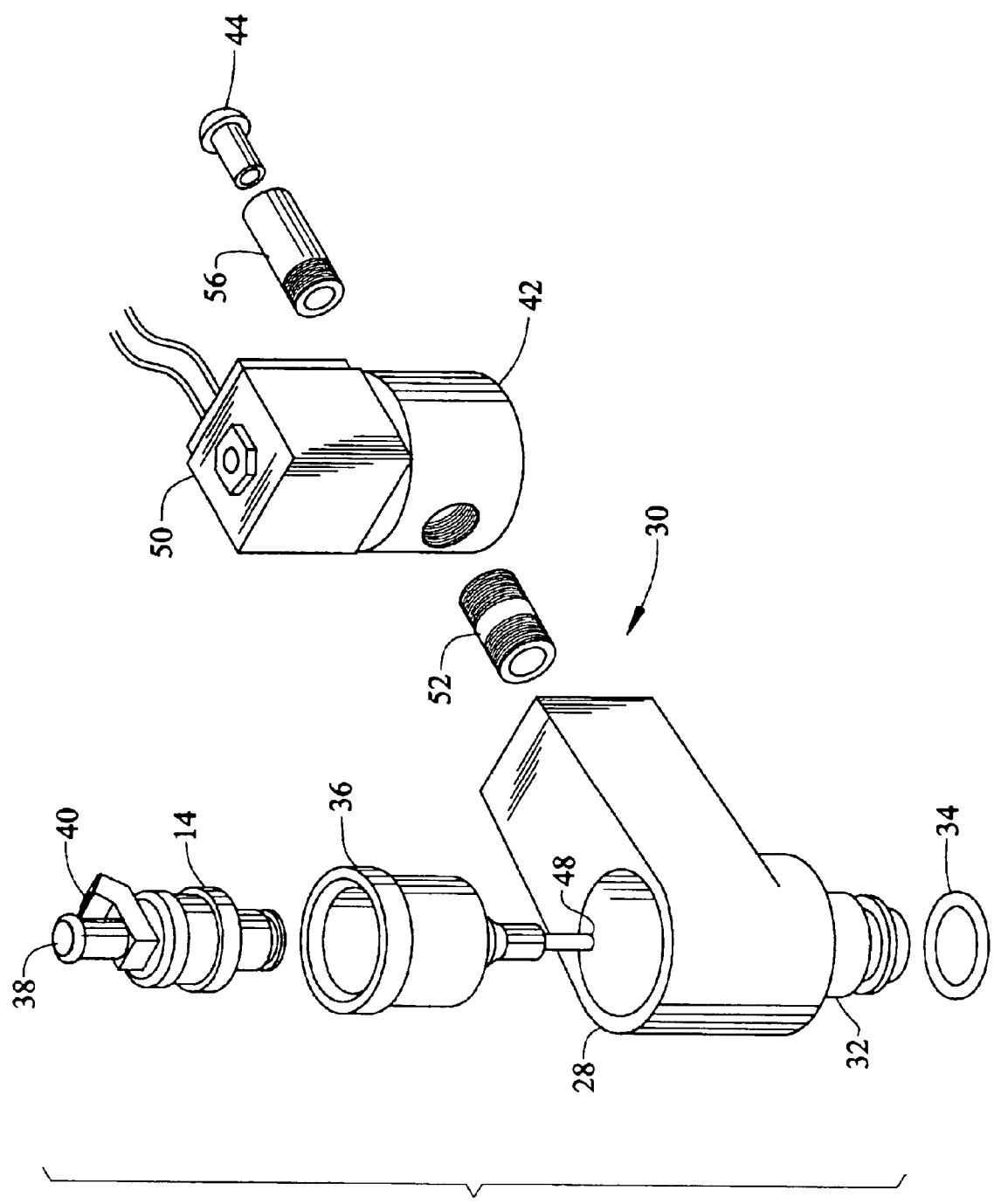
FIG. 3 is an exploded view of the embodiment of the instant invention shown in FIG. 2.
Figure 4:
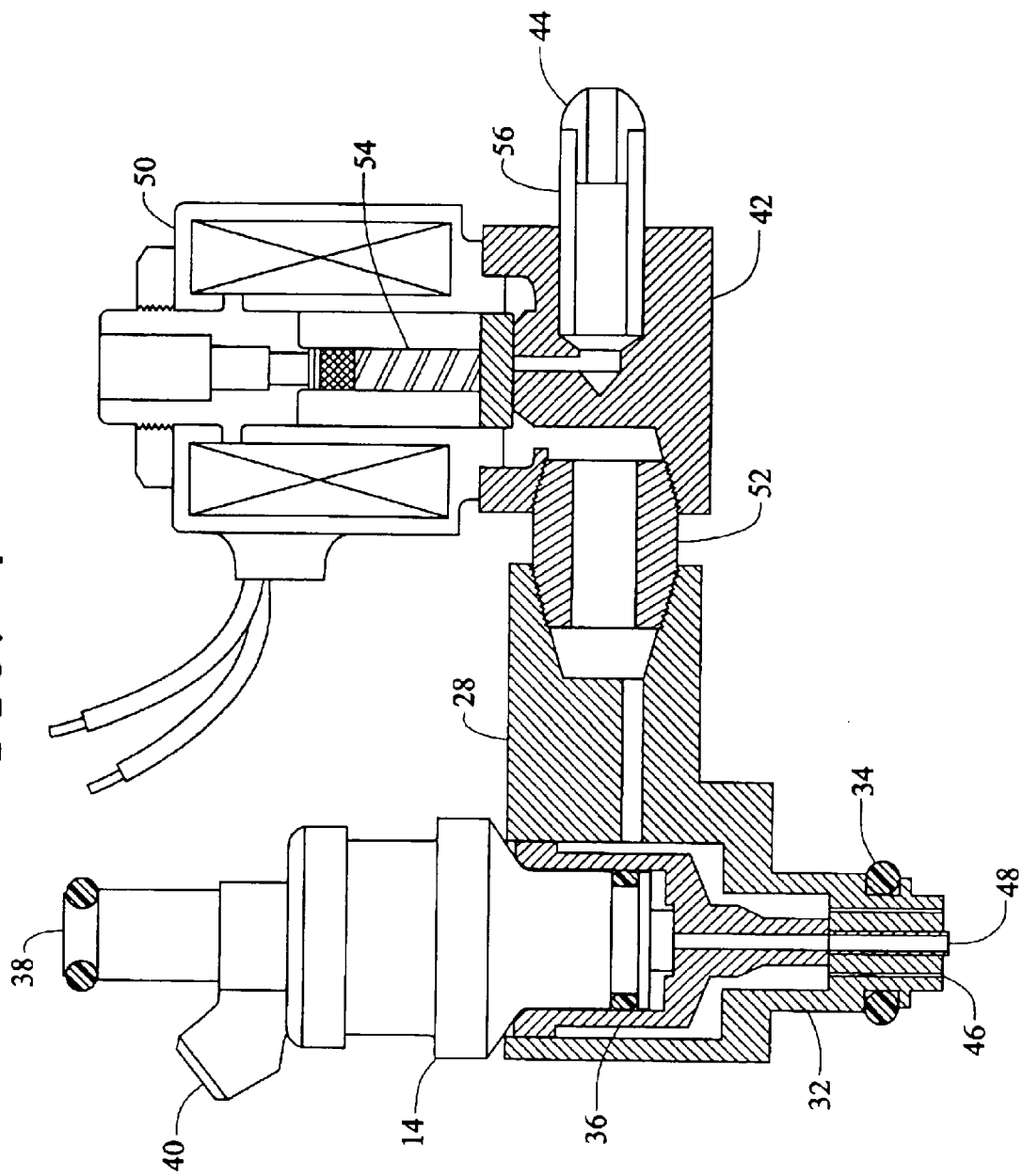
FIG. 4 is a section view illustrating the instant invention shown in FIG. 2 along the longitudinal centerline.

Referring to FIGS. 2 thru 4, perspective, exploded and sectioned views of the injector unit are illustrated. The components of the fuel injector unit 12 briefly discussed hereinabove relative to FIG. 1 will now be described in more detail with respect to the exemplary embodiment in FIGS. 2 thru 4. The injector unit of FIGS. 2, 3 and 4 includes all of the components described in the fuel injector unit of FIG. 1 and is merely a practical embodiment of the schematic representation of the injector unit of FIG. 1 except that the supply tanks, on-board computer and control unit are omitted for clarity. In this practical embodiment, the fuel injection unit 12 is generally comprised of an adapter manifold 28 containing a liquid injector 14 and a gas injector 30. The nozzle portion 32 of the adapter manifold 28 is constructed and arranged to permit the entire set of injector unit components to be held together and in place by a standard automotive fuel injection cavity (not shown). The nozzle portion 32 of the adapter manifold sealably engages the fuel injection cavity via o-ring 34. Clamps, fasteners or other attachment means well known in the art may be used to retain the adapter manifold 28 in place with respect to the fuel injection cavity. The adapter manifold 28 is preferably constructed of aluminum but may be constructed of other suitable materials which may include but should not be limited to rubber, plastic, metal, phenolic, fiber-glass or combinations thereof. The adapter manifold is preferably constructed and arranged with an internal sleeve 36 for cooperation with the liquid fuel injector 14. The internal sleeve 36 is constructed having a plurality of internal bores and external diameters for positioning the fuel injector and directing the liquid fuel into the combustion chamber through a liquid fuel orifice 48 while keeping the liquid fuel separated from the gaseous fuel within the adapter manifold 28. The liquid fuel injector is provided with a fuel inlet 38 for allowing liquid fuel to enter the injector 14 and an electric terminal 40 for communication with the vehicles on-board computer 18. Also included in the adapter manifold is the gas injector assembly 30. The gas injector assembly 30 includes a solenoid valve 42, a flow control jet 44, and a gas injector orifice 46. The solenoid valve 42 is of a conventional design including a plunger valve element 54 (FIG. 4) normally biased into a closed position by a spring to prevent gas flow through the nozzle orifices 46 into a combustion chamber. The solenoid valve 42 is preferably threadedly attached to the adapter manifold 28 via nipple 52 to allow versatility and replaceability. In an alternative embodiment not shown the valve and the adapter manifold could be formed as one piece thereby eliminating the nipple 52. The gaseous fuel injector 30 is provided with a fuel inlet 56 including the flow control jet 44 for allowing controlled flow of gaseous fuel from the supply 20 to enter the injector 30. The electric control module 26 cooperating with the on-board computer 18 and the solenoid 50 control the opening of the plunger valve element by controlling electrical signals sent to the solenoid 50. When the plunger valve is in the closed position the flow of gaseous fuel is blocked from flowing into a cylinder. To initiate a gaseous injection event, the solenoid is actuated thereby opening the plunger valve 54 allowing gaseous fuel to flow from the gas supply 20 through the gas nozzle 46 and into the combustion chamber. The effective flow area through the gas injection orifices 46, the flow control jet 44 and the duration of the opening of the plunger valve element, all determine the quantity of gaseous fuel delivered to the combustion chamber of an engine. The fuel injection system as disclosed may be operated in a plurality of modes of operation for injecting all gaseous fuel, all liquid fuel or infinite combinations of both fuels. This versatility allows the vehicle operator to pick a desired fuel based on fuel availability or desired operating parameters.

Figure 5:
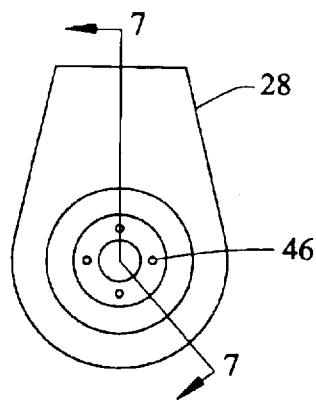
FIG. 5 is a top view illustrating the manifold utilized in the instant invention.
Figure 6:
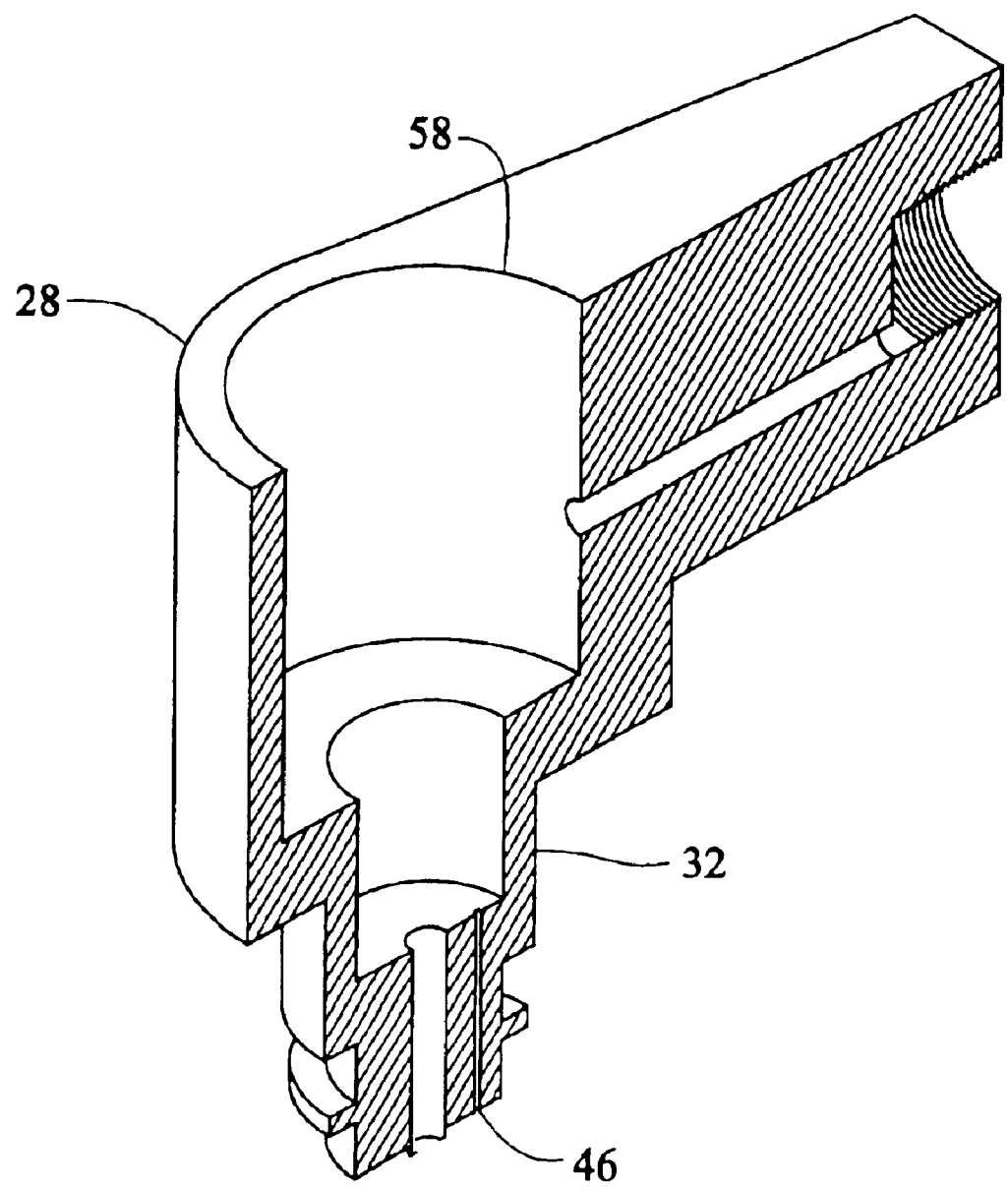
FIG. 6 is a section view taken along lines 1—1 of FIG. 5 illustrating the internal bores of the manifold.
Figure 7:
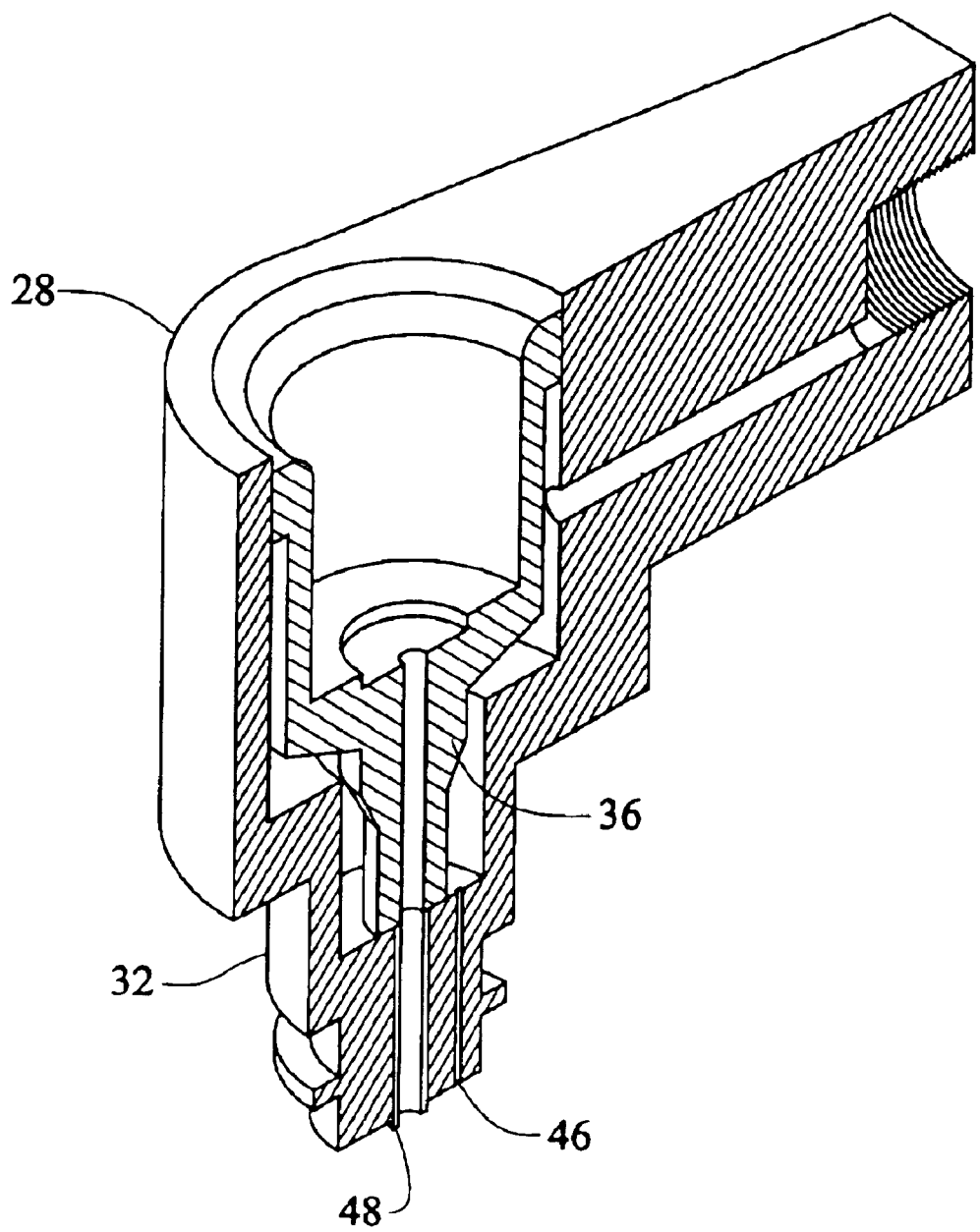
FIG. 7 is a section view taken along lines 1—1 of FIG. 5 illustrating the manifold with the liquid fuel sleeve installed.

FIGS. 5 thru 7 illustrate a top view and section views of the adapter manifold 28. The adapter manifold 28 has a plurality of internal bores located for protecting and attaching a suitable liquid injector 14. Located with the bores of the adapter manifold 28 is the internal sleeve 36. The internal sleeve 36 (FIG. 7) being generally tubular in shape and having a plurality of external diameters and internal bores, the nozzle bore 48 extending through the generally tubular adapter manifold 28 so that the liquid injector 14 is in fluid connection with the combustion chamber of the engine. In this manner the internal sleeve 36 can be constructed and arranged to accommodate a variety of injector bodies which may vary based on the volume of liquid injected per spray cycle. The internal sleeve 36 should be suitably attached to the adapter manifold 28 by any suitable method which is well known in the art which may include but should not be limited to welding, epoxying or glueing. In the preferred embodiment the internal sleeve 36 is constructed of aluminum, but may be constructed of other suitable materials which may include but should not be limited to plastic, metal, phenolic, fiber-glass or combinations thereof. It is also contemplated and understood that methods well known in the art may be used to form the manifold 28 and the sleeve 36 as one piece.

Figure 8:
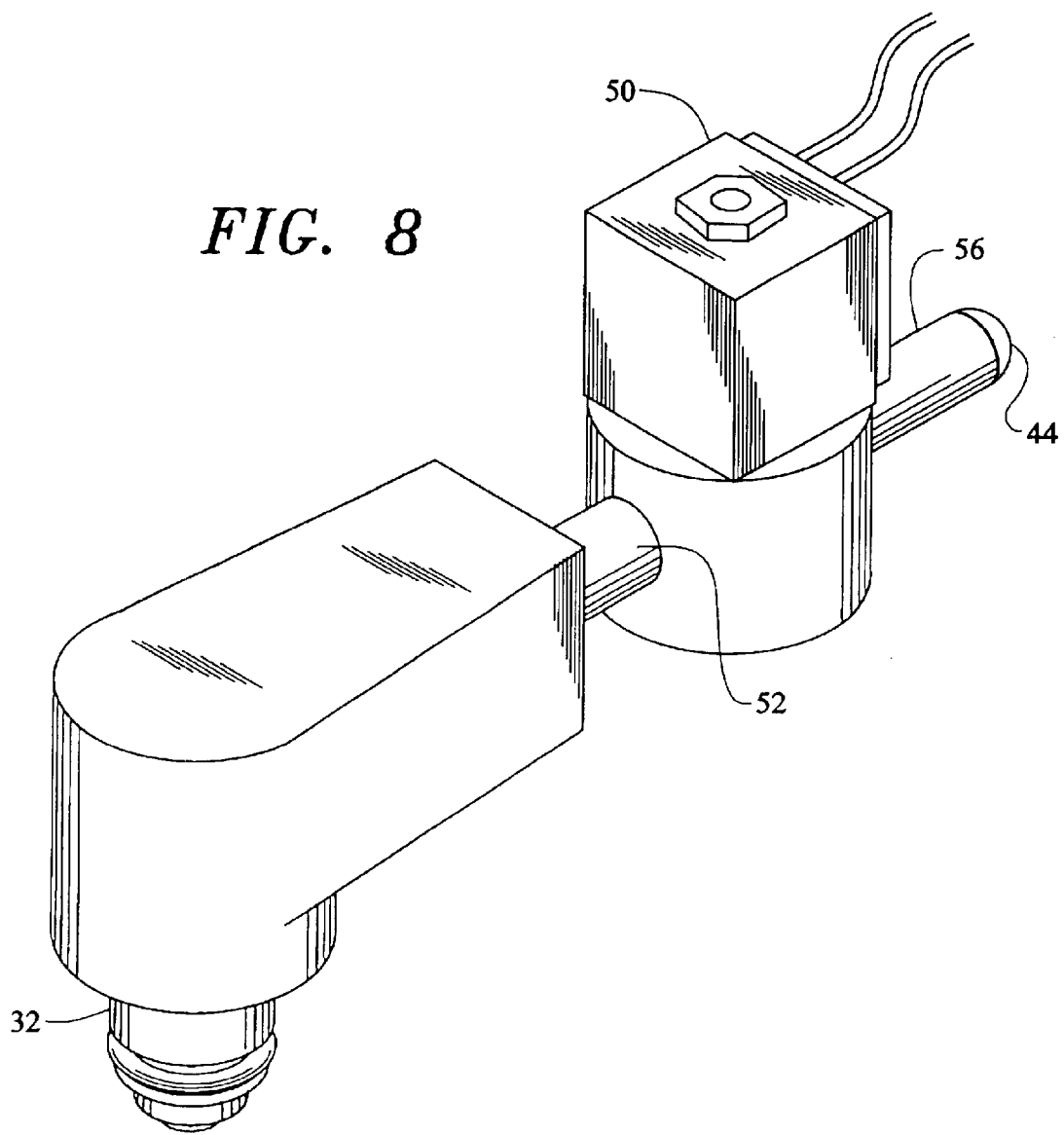
FIG. 8 is a perspective view of an alternative embodiment of the instant invention.

Referring to FIG. 8, an alternative embodiment of the instant invention is illustrated. In the alternative embodiment the gaseous fuel injector is utilized without the liquid injector. In this manner the instant invention can be utilized to inject gaseous fuels into an internal combustion engine for complete operation thereof.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fuel injection system for controlling fuel injection into combustion chambers of a multi-cylinder combustion engine, comprising:
   a gaseous fuel supply for supplying gaseous fuel at a supply pressure level;
   a common gaseous fuel rail in fluid communication with said gaseous fuel supply and containing said gaseous fuel at a common gaseous rail pressure;
   an adapter manifold having at least one gaseous fuel nozzle in fluid communication with a combustion chamber, said adapter manifold constructed and arranged to cooperate with a fuel injector cavity;
   a valve means for controlling the flow of said gaseous fuel, said valve means in fluid communication with said common gaseous fuel rail and said adapter manifold;
   an electric control module in communication with said valve means, said control module constructed and arranged for operative control of said valve means;
   wherein said fuel injection system is operable to inject said gaseous fuel at said common rail pressure through said gaseous fuel nozzle into a combustion chamber;
   the fuel injection system including a flame-arrester for arresting a flame in said gaseous fuel rail, said flame arrester in fluid communication with said gaseous fuel rail and said gaseous fuel supply.

2. The fuel injection system of claim 1 wherein said valve means includes at least one solenoid in communication with said electric control module, said at least one solenoid operable to control flow of said gaseous fuel from said common gaseous fuel rail through said adapter manifold.

3. The fuel injection system of claim 1 wherein said valve means includes at least one servomechanism in communication with said electric control module, said at least one servomechanism operable to control flow of said gaseous fuel from said common gaseous fuel rail through said adapter manifold.

4. The fuel injection system of claim 1 wherein said control module is in communication with at least one vehicular on-board computer.

5. The fuel injection system of claim 1 including a check valve for preventing backward flow of said gaseous fuel, said check valve in fluid communication with said gaseous fuel rail and said gaseous fuel supply.

6. The fuel injection system of claim 1 including:
   a liquid fuel supply for supplying liquid fuel at a supply pressure level;
   a common liquid fuel rail in fluid communication with said liquid fuel supply and containing said liquid fuel at a common liquid fuel rail pressure;
   at least one liquid fuel injector in fluid communication with said liquid fuel rail;
   wherein said fuel injection system is selectively operable to inject gaseous or liquid fuel at said common rail pressures into a combustion chamber.

7. The fuel injection system of claim 6 wherein said adapter manifold includes:
   an attachment means for securing said liquid fuel injector in an operative position within said adapter manifold;
   at lease one liquid fuel nozzle in fluid communication with a combustion chamber and said liquid fuel injector;
   wherein said fuel injection system is operable to inject said liquid fuel at said common rail pressure through said liquid fuel nozzle into a combustion chamber.

8. A fuel injection system kit for installation on new or existing internal combustion engines comprising:
   a common gaseous fuel rail constructed and arranged for fluid communication with a gaseous fuel supply and containing a gaseous fuel from said gaseous fuel supply at a common gaseous rail pressure;
   an adapter manifold having at lease one gaseous fuel nozzle in fluid communication with a combustion chamber, said adapter manifold constructed and arranged to cooperate with a fuel injector cavity;
   a valve means for controlling the flow of said gaseous fuel, said valve means in fluid communication with said common gaseous fuel rail and said adapter manifold;
   an electric control module in communication with said valve means, said control module constructed and arranged for operative control of said valve means;
   wherein said fuel injection system is operable to inject said gaseous fuel at said common rail pressure through said gaseous fuel mozzle into a combustion chamber;
   a flame-arrester for arresting a flame in said gaseous fuel rail, said flame arrester in fluid communication with said gaseous fuel rail and said gaseous fuel supply.

9. The fuel injection system kit of claim 8 wherein said valve means includes at least one solenoid constructed and arranged to communicate with said electric control module, said at least one solenoid operable to control flow of said gaseous fuel from said common gaseous fuel rail through said adapter manifold.

10. The fuel injection system kit of claim 8 wherein said valve means includes at least one servomechanism constructed and arranged to communicate with said electric control module, said at least one servomechanism operable to control flow of said gaseous fuel from said common gaseous fuel rail through said adapter manifold.

11. The fuel injection system of claim 8 wherein said control module is constructed and arranged to communicate with at least one vehicular on-board computer.

12. The fuel injection system of claim 8 including:
   a common liquid fuel rail constructed and arranged for fluid communication with a liquid fuel supply and containing said liquid fuel at a common liquid fuel rail pressure;
   at least one liquid fuel injector in fluid communication with said liquid fuel rail;
   wherein said fuel injection system is selectively operable to inject gaseous or liquid fuel at said common rail pressures into a combustion chamber.

13. The fuel injection system of claim 12 wherein said adapter manifold includes:
   an attachment means for securing said liquid fuel injector in an operative position within said adapter manifold;
   at least one liquid fuel nozzle in fluid communication with a combustion chamber and said liquid fuel injectior;
   wherein said fuel injection system is operable to inject said liquid fuel at said common rail pressure through said liquid fuel nozzle into a combustion chamber.

* * * * *